(12) United States Patent
Mody et al.

(10) Patent No.: US 12,333,405 B2
(45) Date of Patent: Jun. 17, 2025

(54) METHODS AND APPARATUS FOR MATRIX PROCESSING IN A CONVOLUTIONAL NEURAL NETWORK

(71) Applicant: Texas Instruments Incorporated, Dallas, TX (US)

(72) Inventors: Mihir Narendra Mody, Bangalore (IN); Shyam Jagannathan, Bangalore (IN); Manu Mathew, Bangalore (IN); Jason T. Jones, Richmond, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 701 days.

(21) Appl. No.: 17/035,879

(22) Filed: Sep. 29, 2020

(65) Prior Publication Data

US 2022/0101083 A1  Mar. 31, 2022

Related U.S. Application Data

(63) Continuation of application No. 15/784,588, filed on Oct. 16, 2017, now Pat. No. 10,824,934.

(60) Provisional application No. 62/445,493, filed on Jan. 12, 2017.

(51) Int. Cl.
*G06N 3/04* (2023.01)
(52) U.S. Cl.
CPC ...................................... *G06N 3/04* (2013.01)
(58) Field of Classification Search
CPC ...................................................... G06N 3/04
See application file for complete search history.

(56) References Cited

U.S. PATENT DOCUMENTS

| | | |
|---|---|---|
| 9,384,168 B2 | 7/2016 | Mortensen |
| 2004/0151356 A1 | 8/2004 | Li et al. |
| 2005/0125369 A1 | 6/2005 | Buck et al. |
| 2005/0197977 A1 | 9/2005 | Buck et al. |
| 2007/0028076 A1 | 2/2007 | Wezelenburg |
| 2016/0259826 A1 | 9/2016 | Acar |
| 2016/0342890 A1 | 11/2016 | Young |
| 2016/0342891 A1 | 11/2016 | Ross et al. |
| 2016/0358069 A1 | 12/2016 | Brothers et al. |
| 2017/0221176 A1* | 8/2017 | Munteanu ............ G06V 10/955 |

OTHER PUBLICATIONS

Hijazi, Samer, Rishi Kumar, and Chris Rowen. "Using convolutional neural networks for image recognition." Cadence Design Systems Inc.: San Jose, CA, USA 9 (2015): 1. (Year: 2015).*
Moons et al. A 0.3-2.6 TOPS/W Precision-Scalable Processor for Real-Time Large-Scale ConvNets. 2016 (Year: 2016).*

(Continued)

*Primary Examiner* — Michelle T Bechtold
*Assistant Examiner* — Robert Bejcek, II
(74) *Attorney, Agent, or Firm* — Carl G. Peterson; Frank D. Cimino

(57) ABSTRACT

Described examples include an integrated circuit including a vector multiply unit including a plurality of multiply/accumulate nodes, in which the vector multiply unit is operable to provide an output from the multiply/accumulate nodes, a first data feeder operable to provide first data to the vector multiply unit in vector format, and a second data feeder operable to provide second data to the vector multiply unit in vector format.

14 Claims, 14 Drawing Sheets

(56) References Cited

OTHER PUBLICATIONS

Athale et al. Optical Processing Using Outer-Product Concepts. 1984. (Year: 1984).*
Rahman et al. Efficient FPGA Acceleration of Convolutional Neural Networks Using Logical-3D Compute Array. IEEE 2016 (Year: 2016).*
Sankaradas et al., A Massively Parallel Coprocessor for Convolutional Neural Networks. 2009 20th IEEE International Conference on Application-specific Systems, Architectures and Processors (Year: 2009).*
International Search Report for PCT/US2018/013586 mailed Jun. 28, 2018.

* cited by examiner

METHODS AND APPARATUS FOR MATRIX PROCESSING IN A CONVOLUTIONAL NEURAL NETWORK

CROSS-REFERENCE TO RELATED APPLICATIONS

This application is a continuation of U.S. patent application Ser. No. 15/784,588, filed on Oct. 16, 2017, which claims the benefit under 35 U.S.C. § 119(e) to co-owned U.S. Provisional Patent Application Ser. No. 62/445,493, filed Jan. 12, 2017, entitled "Methods and Apparatus for Matrix Processing in a Convolutional Neural Network," which is hereby incorporated by reference in its entirety herein.

TECHNICAL FIELD

This relates generally to matrix processing, and, in particular, to convolutional neural networks.

BACKGROUND

Traditional camera based object recognition systems with computer vision processing are used in various markets, such as: automotive; robotics; industrial; wearable computing; and mobile. In the past, these systems used custom designed features followed by a pre-trained classifier to classify objects of interests in the images. Modern day classification systems implement "deep learning" techniques such as Convolution Neural Networks (CNNs) that have been enabled through more powerful and cheaper computing resources.

A CNN structure often receives input data, which is usually an RGB color image, and convolves samples of the input data with a set of pre-trained weights. A non-linear activation function, such as tanh, sigmoid, ReLu, follows the convolution layers. Several such convolution layers are used together to provide robust feature identification. Pooling layers, often max-pooling, are inserted between convolution layers to provide some invariance to the size of objects in the image data. Pooling also helps keep the physical feature size of a device implementing the CNN in check. Usually, pooling reduces the feature size by about a factor of two along a width direction and height direction of the feature planes.

A fully connected neural network processes the learned output feature vector for classification. There can be several such fully-connected layers leading to a "soft-max" layer which normalizes the results across various classes of interest. There are multiple network topologies which are very deep (multiple layers) and very wide (more convolution channels per layer). Such wide and deep networks result in huge computational and data complexity at up to hundreds of Giga or Tera Multiply and Add operations ("Giga Operations Per Second" (GOPS) or "Tera Operations Per Second" (TOPS)). The fully-connected layer uses huge data bandwidth compared to the convolution layer, and is often realized in a physical implementation using matrix multipliers. Optimized software implementations improve performance on existing devices, although they fall short of providing the huge compute resources needed to complete the convolution and feature identification in the desired time period. Therefore, CNN often uses specialized hardware. There is a spectrum of optimized CNN hardware implementations available on field programmable gate arrays (FPGAs) as well as application specific integrated circuits (ASICs) and complex logic programmable devices (CPLDS). These solutions use systolic as well as streaming architectures targeting optimal power, performance and area targets. One of the limitations of these solutions is lower performance. These implementations have a performance in the range of 10's or 100's GOPS. In addition, these solutions are severely bottlenecked by data movements.

SUMMARY

In accordance with an example aspect, an integrated circuit includes a vector multiply unit including a plurality of multiply/accumulate nodes, in which the vector multiply unit is operable to provide an output from the multiply/accumulate nodes using an outer product of two input vectors, a first data feeder operable to provide first data to the vector multiply unit in vector format, and a second data feeder operable to provide second data to the vector multiply unit in vector format.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled." The term "plurality" as used herein means two or more.

Figure 1:
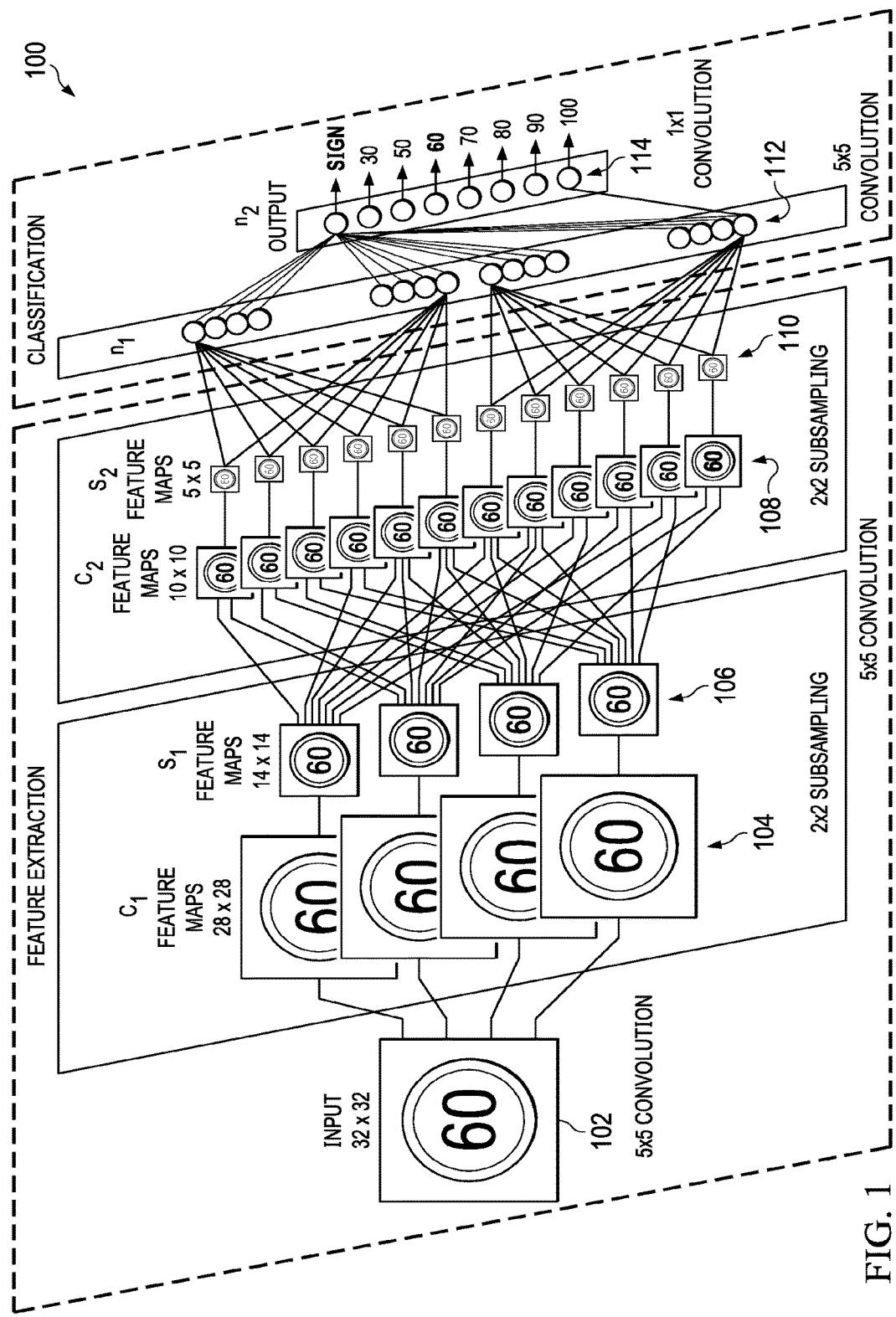
FIG. 1 is a block diagram of a convolutional neural network.

FIG. 1 is a block diagram of a convolutional neural network. Convolutional neural network (CNN) 100 includes image input 102, feature map layers 104, 106, 108 and 110, fully connected layers 112 and output 114. This description assumes that this example CNN has been trained to recognize patterns in images and that it is processing data from a visual input. In the simplified drawing of FIG. 1, a 32×32 feature value image input 102 is processed to feature maps 104 using convolutional filters. In this example, the convolutional filters are 5×5 weight values and move step-wise (are convolved) across the image input 102, as explained further hereinbelow. A 2×2 subsampling of feature maps 104 produces feature maps 106. A convolution of feature maps 106 produces feature maps 108. A subsampling of feature maps 108 produces feature maps 110. Fully connected layer 112 classifies feature maps 110, which is followed by the final non-linear processing at output 114. Output 114 produces a probability that a learned feature is present in the input. As further explained hereinbelow, these steps include complex matrix mathematics. The overall processing load is very large, so this processing should be performed very efficiently. The matrix sizes used are examples for explanatory purposes and other sizes can also be used.

Figure 2:
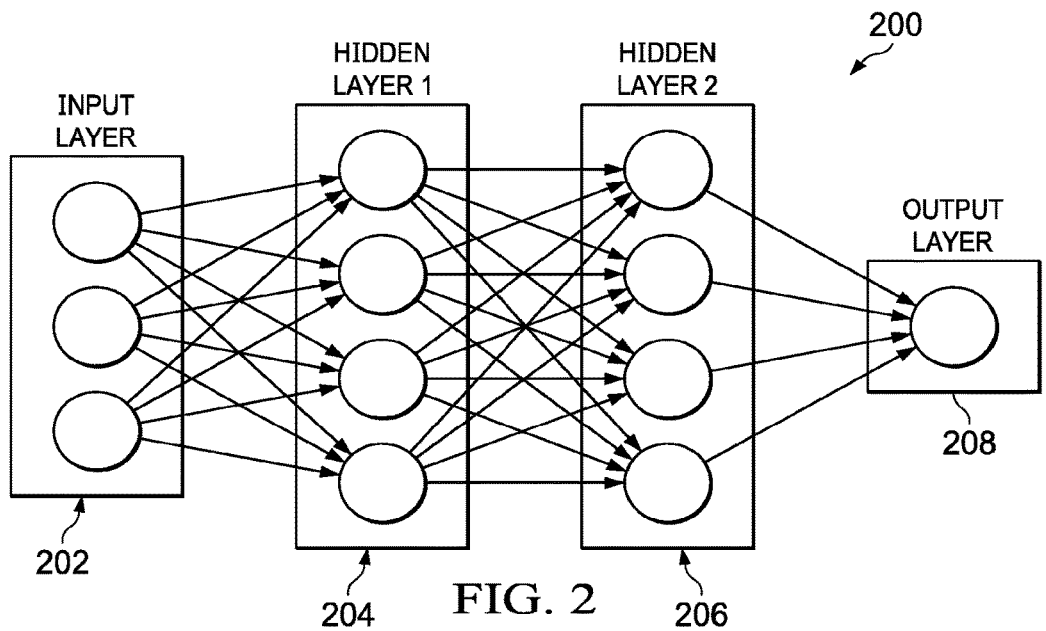
FIG. 2 is a connection diagram for an example neural network.

FIG. 2 is a connection diagram for an example fully connected layer 200 similar to fully connected layer 112 in FIG. 1. Input layer 202 provides the feature maps from the convolution steps (corresponding to 102-110 in FIG. 1) to the first hidden layer 204 for processing. The feature maps are matrix multiplied by feature identifier filters at the nodes of hidden layer 204. Hidden layer 204 provides the results of this filtering to hidden layer 206, where additional matrix multiplication with additional feature identifier filters occurs. Hidden layer 206 feeds output layer 208. FIG. 2 shows two hidden layers. However, any number of hidden layers may be used depending on subject matter and available computing resources. In addition, FIG. 2 shows every node of hidden layer 204 connected to every node of hidden layer 206. Every node between hidden layers may or may not be connected to nodes in the next hidden layer, depending on the network learning process and the subject matter being processed. Output layer 208 is similar to output 114 (FIG. 1).

Figure 3:
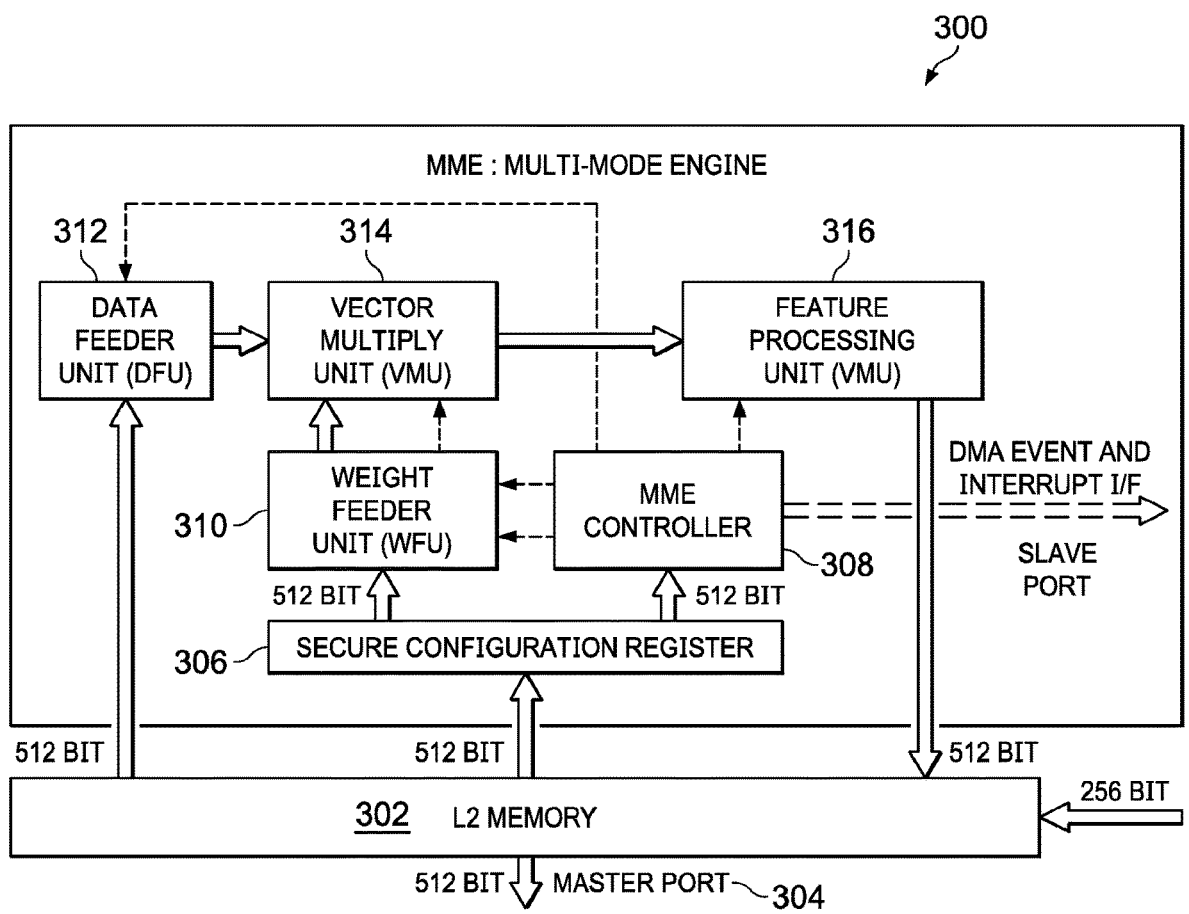
FIG. 3 is a block diagram of a multi-mode engine.

FIG. 3 is a block diagram of an example image processing apparatus or multi-mode engine (MME) 300. Level 2 (L2) memory 302 transfers data from main memory (not shown) via master port 304. Secure configuration register (SCR) 306 routes instructions and filter weights to MME controller 308 and weight feeder unit (WFU) 310, respectively. L2 memory 302 also feeds image data to data feeder unit (DFU) 312. Data feeder unit 312 provides N data inputs and weight feeder unit provides M data inputs to vector multiply unit (VMU) 314. VMU 314 includes a matrix of N×M multiply/accumulate nodes, as further explained hereinbelow. In an example, N is equal to M, and thus the matrix of N×M multiply/accumulate nodes is a square matrix. VMU 314 performs the bulk of the operations to provide the matrix operations for the convolution and fully connected layer operations described hereinabove regarding FIGS. 1 and 2. The operation of VMU 314 is explained further hereinbelow. Feature processing unit 316 performs the non-linear activation functions and/or spatial pooling (for example, subsampling) of output layer 114 as described regarding FIG. 1.

All or a portion of MME 300 may be incorporated in an integrated circuit, a hybrid module or may be implemented as a combination of integrated circuits or modules. In alternative examples, the MME 300 can be implemented using programmable devices such as microprocessors, video processors, mixed signal processors, digital signal processors, or central processing units (CPUs). Cores integrated with additional circuitry such as digital signal processor (DSP) cores, ARM cores, RISC cores and image processing cores can be used. User definable circuitry such as application specific integrated circuits (ASICs) or semi-custom or custom integrated circuits can be used. User definable programmable devices such as field programmable gate arrays (FPGAs) and complex logic programmable devices (CPLDs) can be used. Software executing on a general-purpose computer, processor, or microprocessor can be used to implement MME 300.

Figure 4:
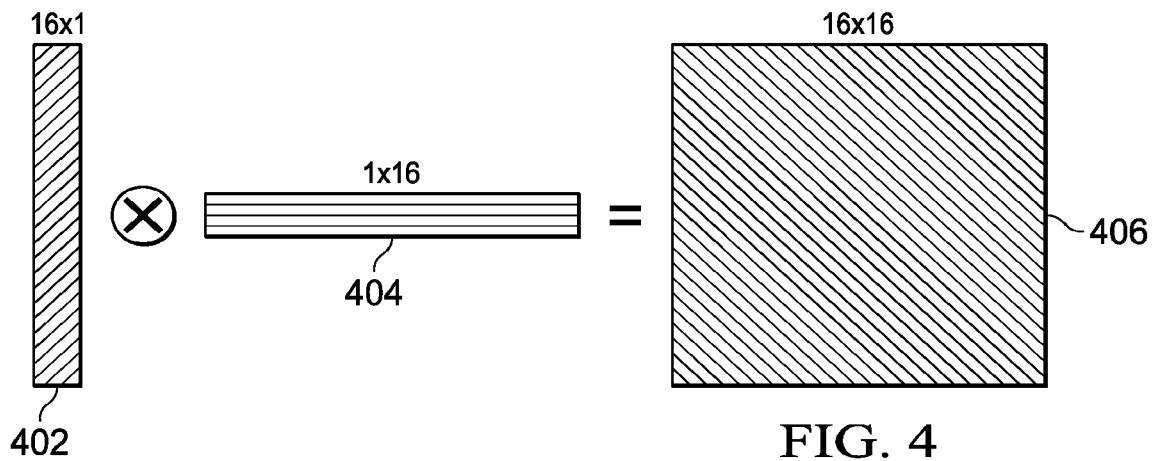
FIG. 4 is an illustration of an implementation of an outer cross product.

FIG. 4 is an illustration of the operation of an outer cross product. Rather than use a product of two matrixes (or matrices), an outer cross product is a cross product of two vectors to generate partial output. As further explained hereinbelow, the vectors are portions of the matrixes. In FIG. 4, vector 402 is the image data (and/or feature values) provided by data feeder unit 312 (FIG. 3.) which includes 16 values (the precision of the values is 16 bits) from a 4×4 portion of the image data (or features). Vector 404 is also a 16-value vector. The cross product of these vectors is a 16×16 matrix 406. However, as further explained hereinbelow, this outer product by itself does not provide a complete solution when determining a convolution or fully connected data point.

Figure 5:
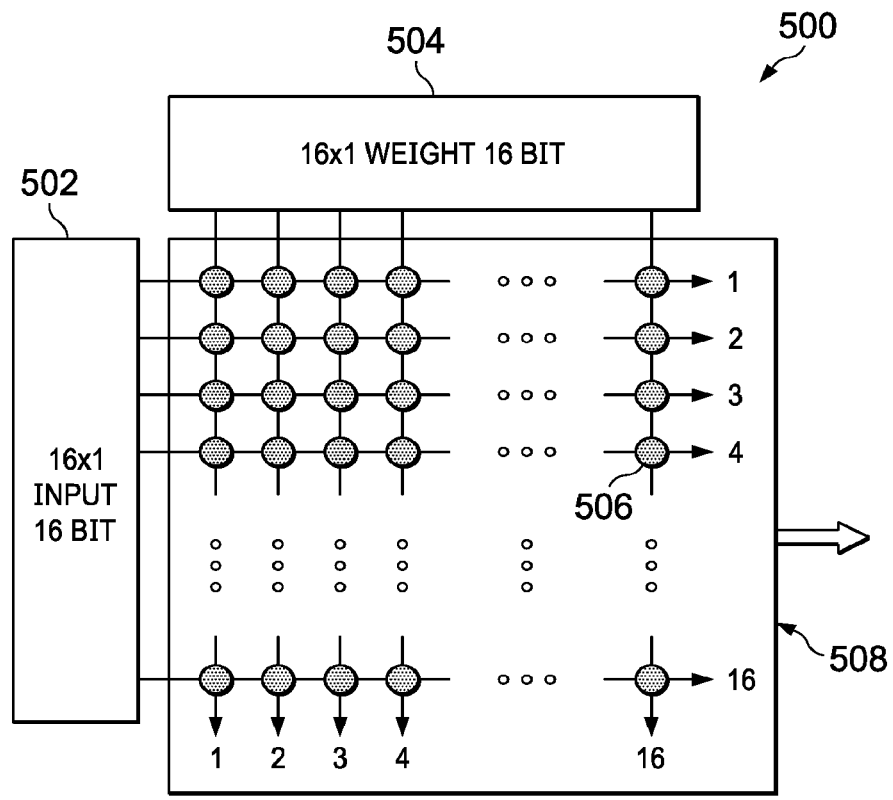
FIG. 5 is a diagram illustrating how a vector multiply unit (VMU) may implement an outer product.

FIG. 5 is a diagram illustrating an example implementation of the outer product operation such as shown in FIG. 4, using a VMU 500 like VMU 314 (FIG. 3). Weight data 504 corresponds to vector 404 (FIG. 4) and is provided by WFU 310 (FIG. 3). Image data 502 corresponds to vector 402 (FIG. 4) and is provided by DFU 312 (FIG. 3). The intersections in the VMU matrix 508 have a multiply/accumulate (MAC) node 506.

Figure 6:
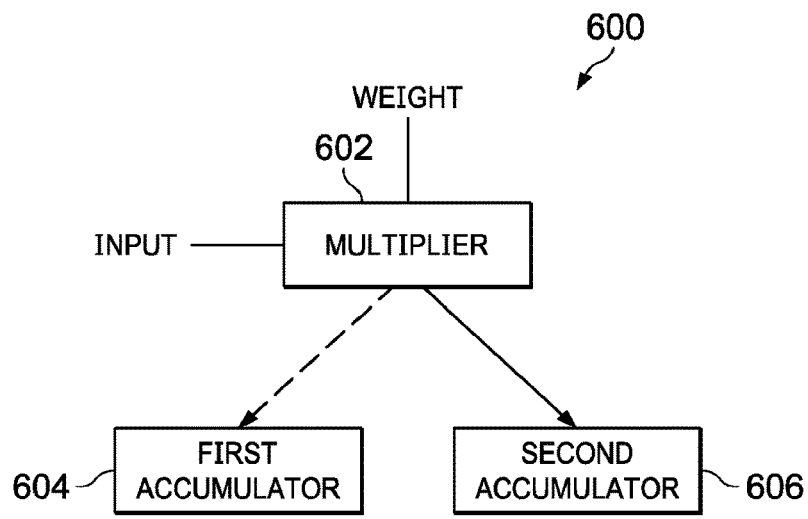
FIG. 6 is a block diagram of one multiply/accumulate node of an example.

FIG. 6 is a block diagram of one multiply/accumulate (MAC) node 600 like MAC node 506 in FIG. 5. Multiplier 602 receives one weight byte and one input byte and outputs the result to either first accumulator 604 or second accumulator 606. The multiplication of multiplier 602 and the accumulation (addition) of either first accumulator 604 or second accumulator 606 occurs during a clock cycle. As more fully explained hereinbelow, the result from multiplier 602 is a partial result. The accumulators add the partial result to prior partial results until a full result can be read out. The term "multiply/accumulate" describes this operation.

Figure 7:
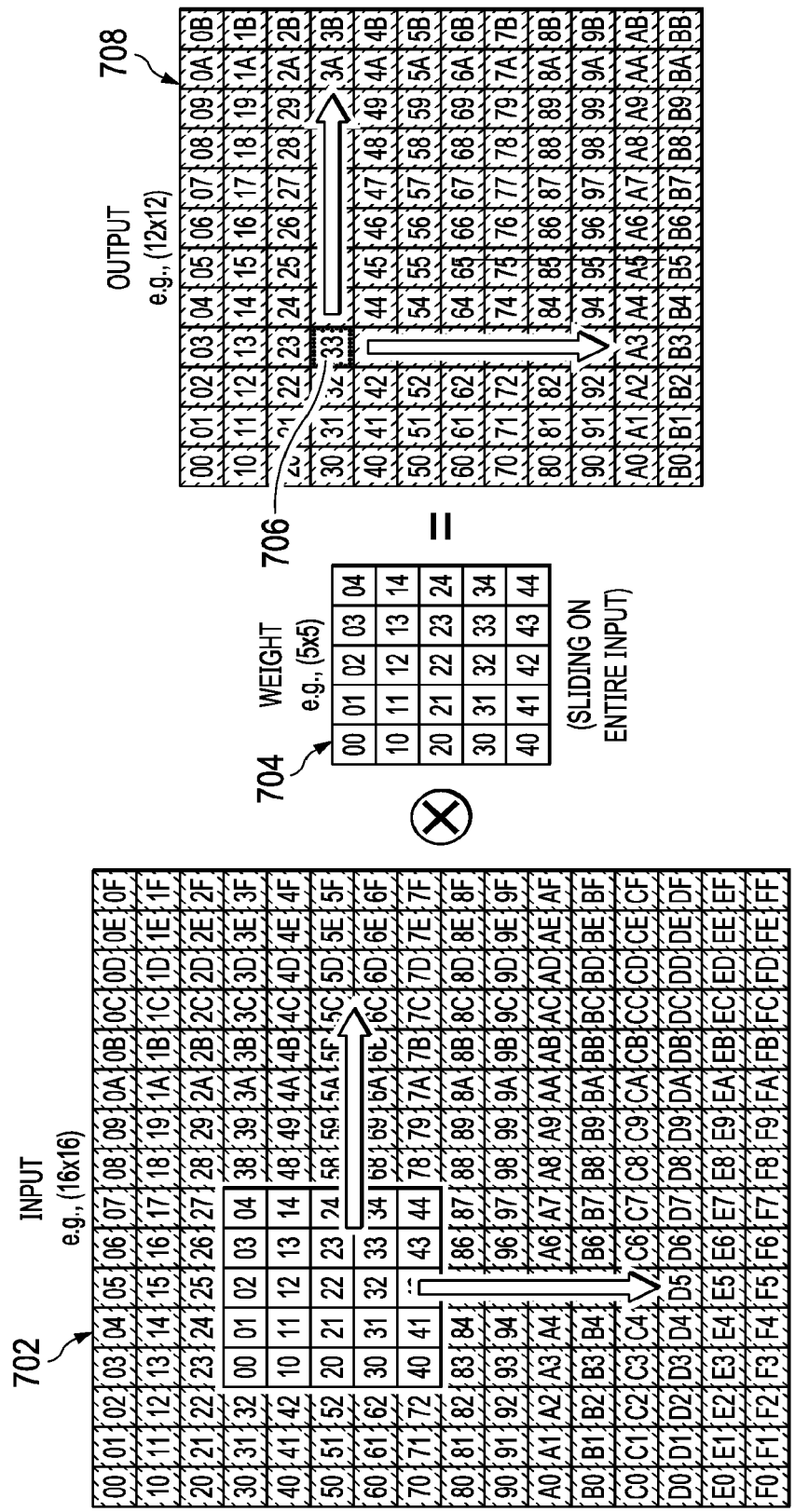
FIG. 7 is an illustration showing the determination of one feature value of a convolution.

FIG. 7 is an illustration showing the determination of a feature value (such as pixel data) of a convolution. In FIG. 7, for the feature values of output matrix 708, the weight matrix 704 is superimposed on the input feature plane 702. For example, to determine the convolution feature-value 706 (labeled "33") in output matrix 708, the feature-value of interest is multiplied by the center feature-value 22 of the weight matrix. The weights are multiplied by a reading area that includes the corresponding input feature values surrounding the feature value of interest. The result is the sum of these multiplied pairs. Equation 1 expresses this process mathematically.

$$\text{Output}(m,n) = \Sigma_{i=0, j=0}^{4,4} \text{Input}(m-2+i, n-2+j) * w(i,j) \quad (1)$$

Where Output is the output matrix 708, Input is the input feature plane 702, m and n are the row and column coordinates, respectively, of the input as shown in matrix 708, i and j are the row and column coordinates, respectively, of the weight matrix as shown in weight matrix 704 and w is the weight matrix. The weight matrix 704 is then shifted to determine the next output or feature value until the output matrix is calculated.

Figure 8:
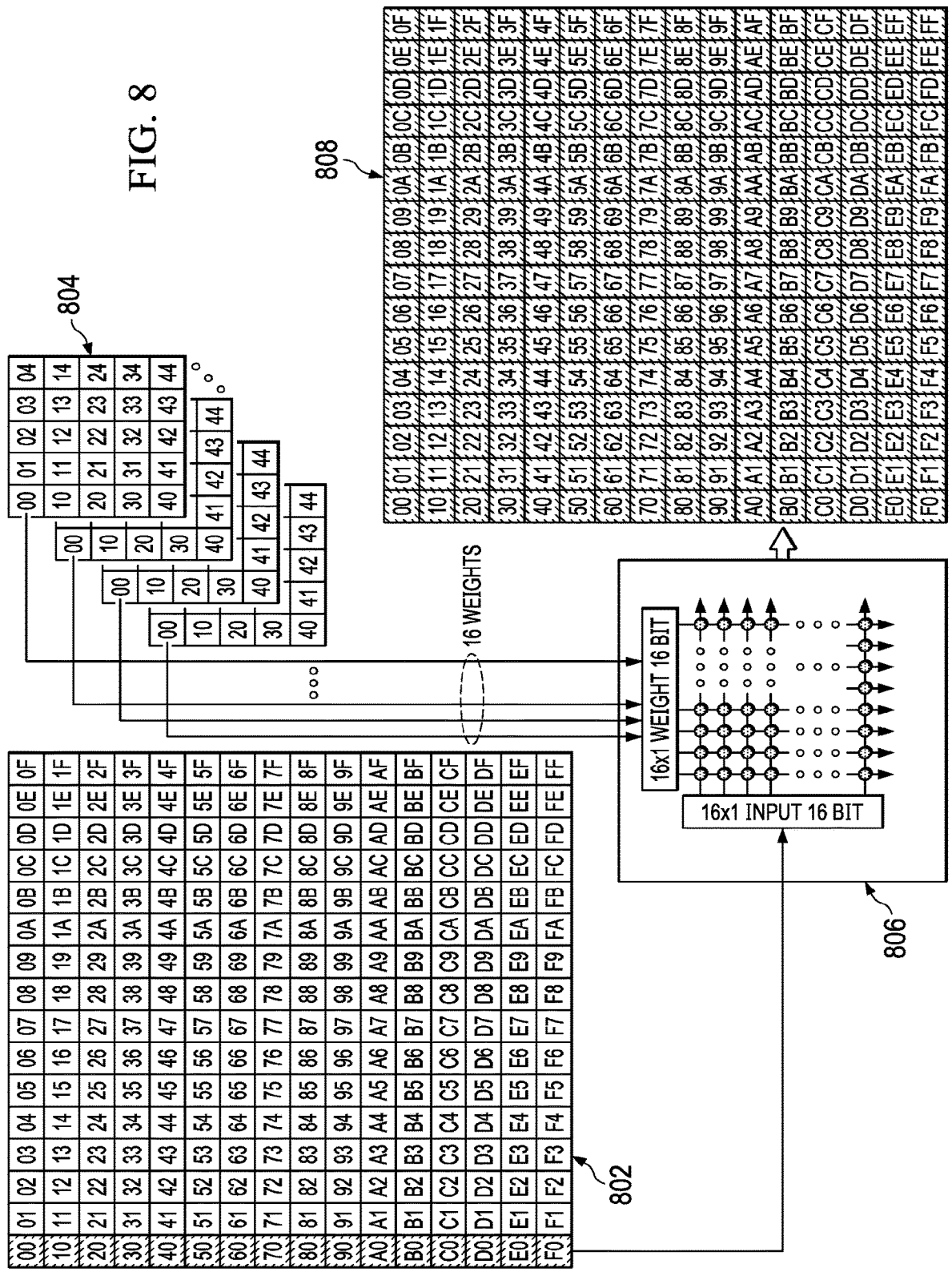
FIGS. 8-10 illustrate operations using the VMU to efficiently calculate convolution.
Figure 9:
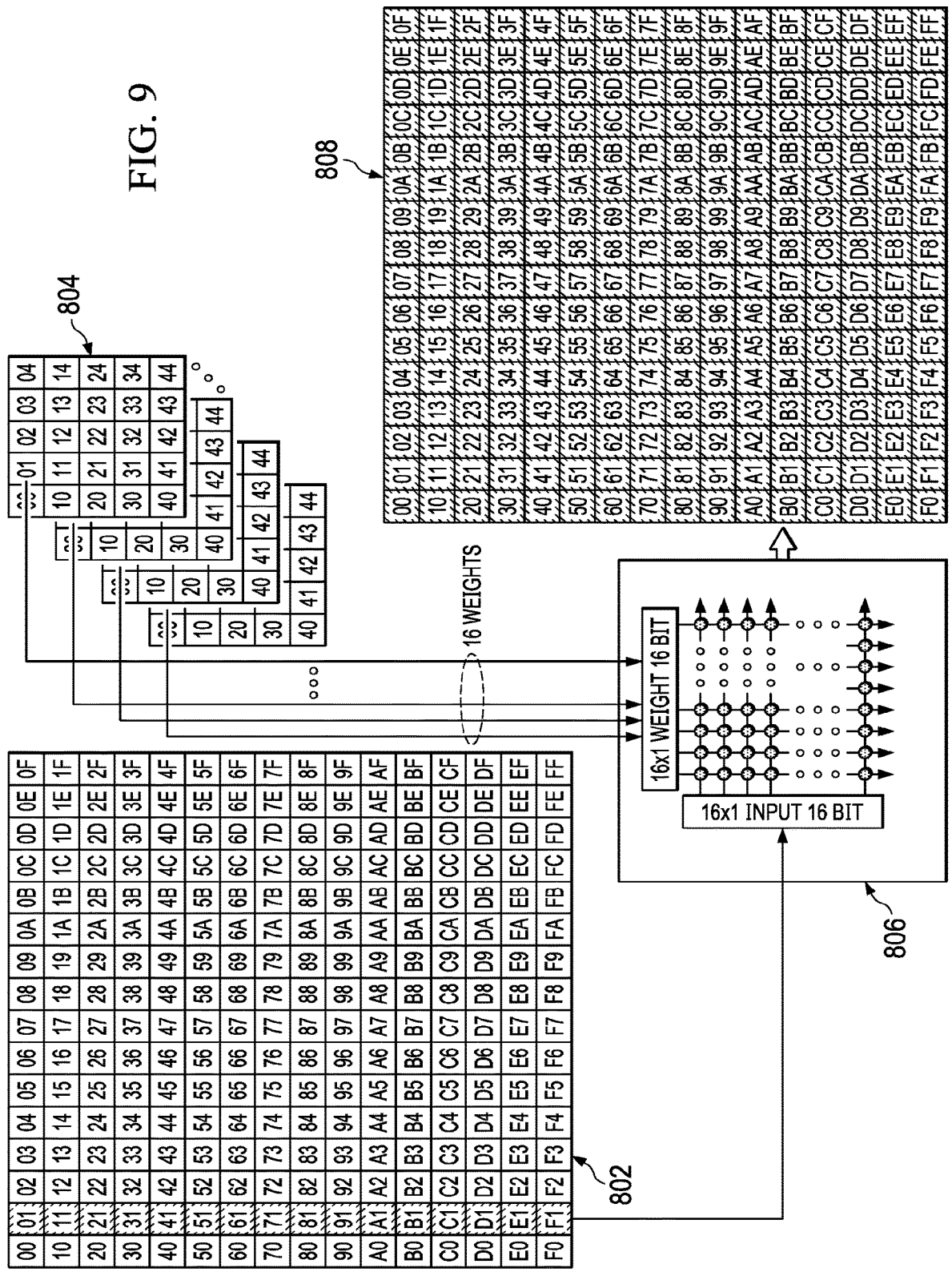
Figure 10:
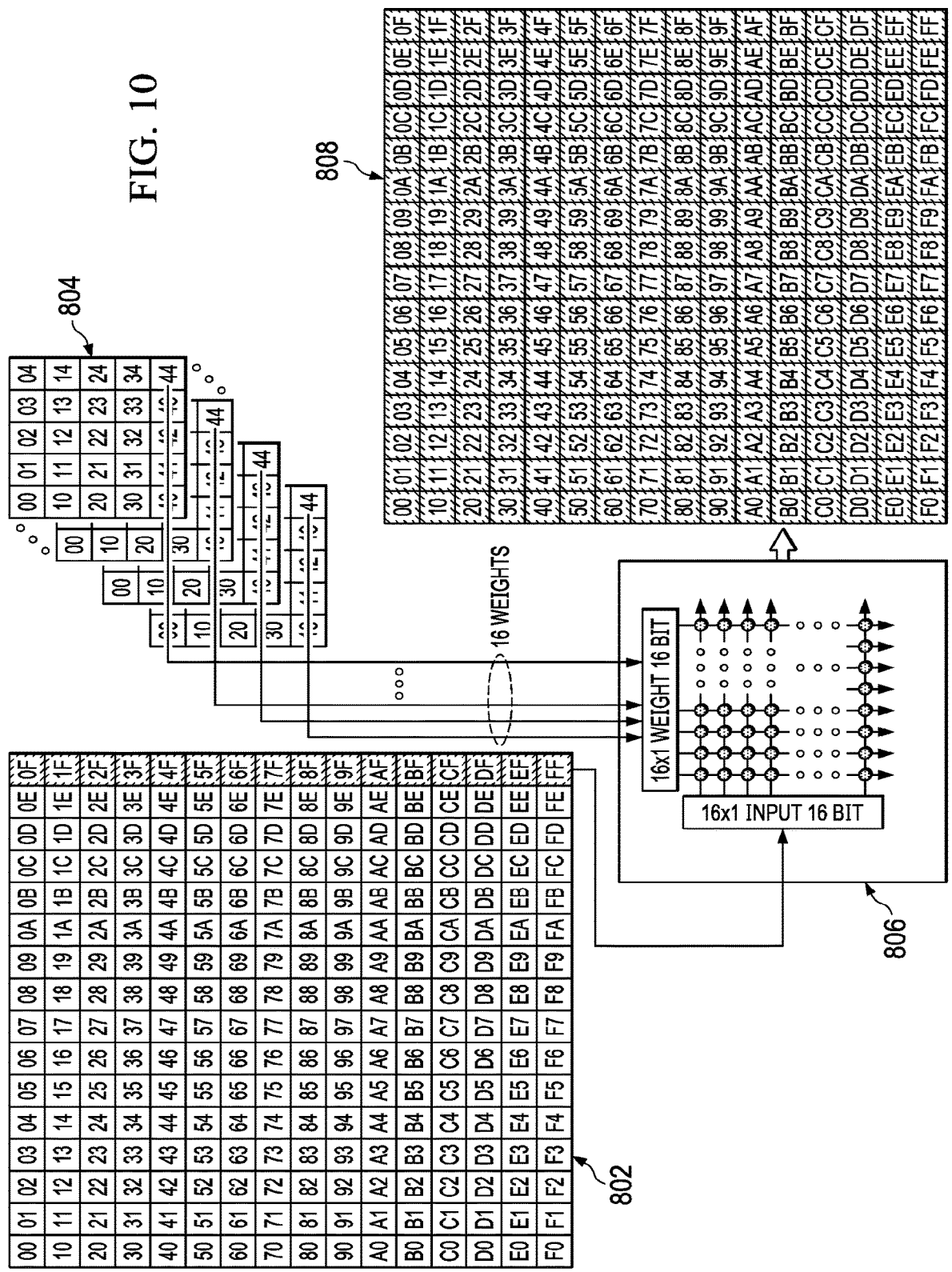

FIGS. 8-10 illustrate using the example VMU of FIG. 5 to efficiently calculate convolution. Inputs 802 and weights 804 do not correspond to the input matrixes of input feature plane 702 and weight matrix 704 (FIG. 7). Rather, DFU 312 and WFU 310 (FIG. 3) rearrange the data and weights so that partial products computed by VMU 806 for one output feature value are directed to one multiplier and one accumulator within one multiply/accumulate node 506 (FIG. 5). In an example, inputs 802 load a column at a time into VMU 806. Each pixel in the column is presented to all of the multiply/accumulate nodes in a row of VMU 806. A row of weights from weights 804 where each weight is a corresponding weight from sixteen convolution filters also loads into VMU 806. For example, weight matrix 704 (FIG. 7) includes twenty-five weights from 00 to 44. In a first step, the row of weights loaded from weights 804 are the 00 weights for sixteen convolution filters. Most intermediate images are processed by multiple convolution filters. For example, each node of input layer 202 (FIG. 2) has four convolution filters applied to produce data for the four nodes of hidden layer 204 (FIG. 2). FIG. 2 is greatly simplified. The hidden layers in most applications are sixteen or thirty-two nodes. As the input data from one node is applied to multiple convolutions, applying sixteen convolutions at a time increases the processing speed. Thus, sixteen bytes of input data 802 are multiplied with one weight byte from sixteen convolution filters as one row of weights 804. This produces 256 multiplications that are accumulated in the nodes of VMU 806.

FIG. 9 illustrates the next step from the step illustrated in FIG. 8. The next row of weight data will be the next weight from sixteen convolution filters. For example, the next weight may be weight 01 from weight matrix 704 (FIG. 7). The next column from inputs 802. The data in the next column of inputs 802 corresponds to the image pixels to which weight 01 is to be applied. This result is then accumulated in the corresponding node of VMU 806. In the example of FIGS. 8-10, weights 804 has 25 weights (for example, 00 through 44). FIG. 10 shows the result after twenty-five cycles. Each row of weights 804 has been applied to the corresponding column of input pixels from input 802. Therefore, the accumulated data from each node is a complete convolution for the corresponding pixel as shown in results matrix 808. That is, the first column of VMU 806 contains sixteen complete convolution pixels for a first convolution filter, the second column of VMU 806 contains sixteen complete convolution pixels for a second convolution filter and so on, such that each column of VMU 806 contains sixteen complete convolution pixels for one of sixteen convolution filters.

Figure 11:
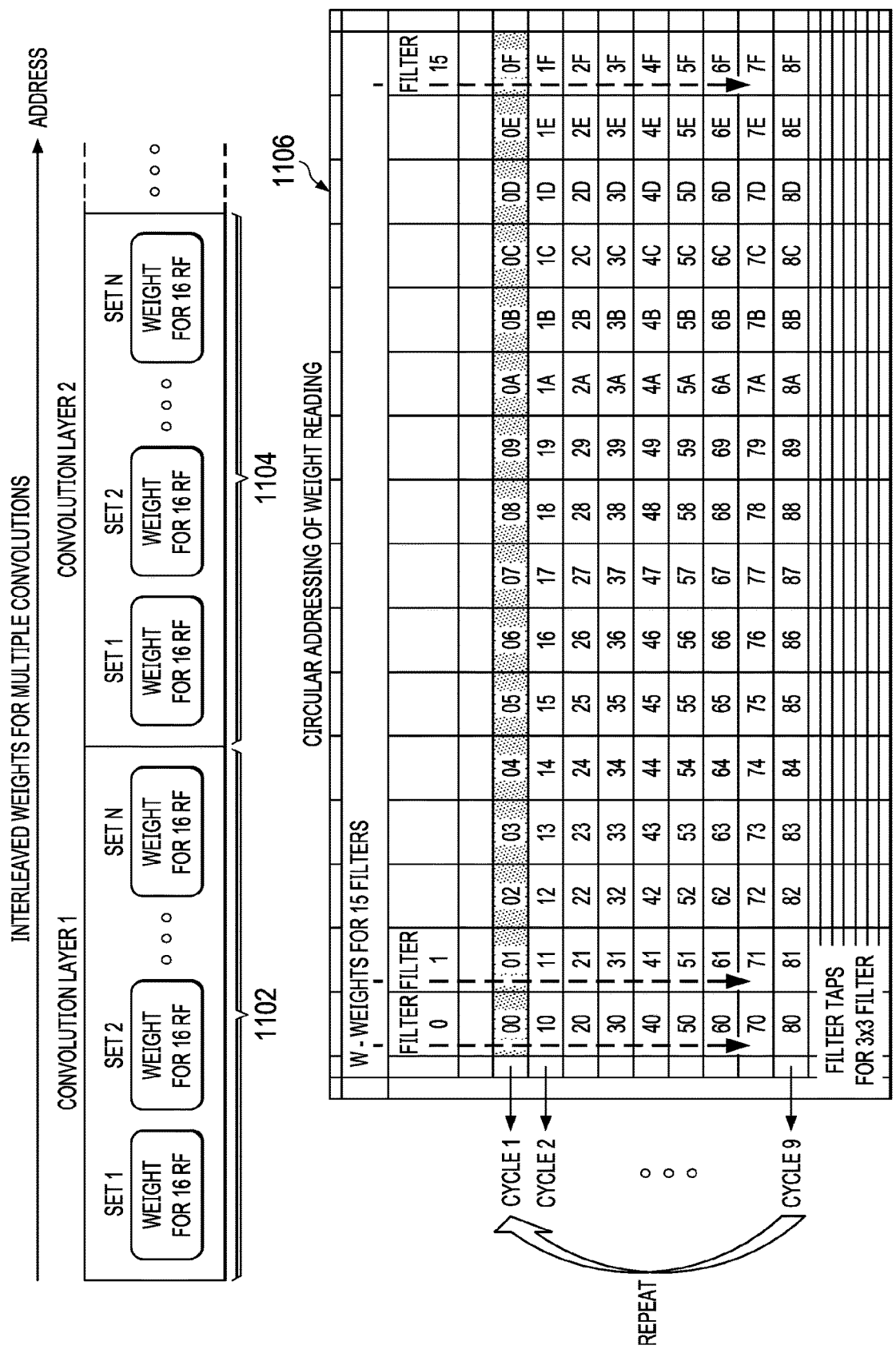
FIG. 11 is a chart showing how multiple sets of weights may be efficiently interleaved in the examples to fully utilize the VMU.

FIG. 11 is a chart illustrating the process of loading weights for multiple convolutions. In this example, a convolution layer (1102, 1104) is organized into sets, where each set includes weights for sixteen receptive factors (RF). Receptive factors are the weights from one position on each of the convolution filters (for example, the 00 position in weight matrix 704). Chart 1106 shows that SET 1 is processed in CYCLE 1, SET 2 in CYCLE 2 and so on to CYCLE 9. In the example of chart 1106, the convolution filters are 3×3, so there are nine cycles. The process then repeats for the next convolution layer (for example, convolution layer 1104) until the convolution is complete for the input image.

Figure 12:
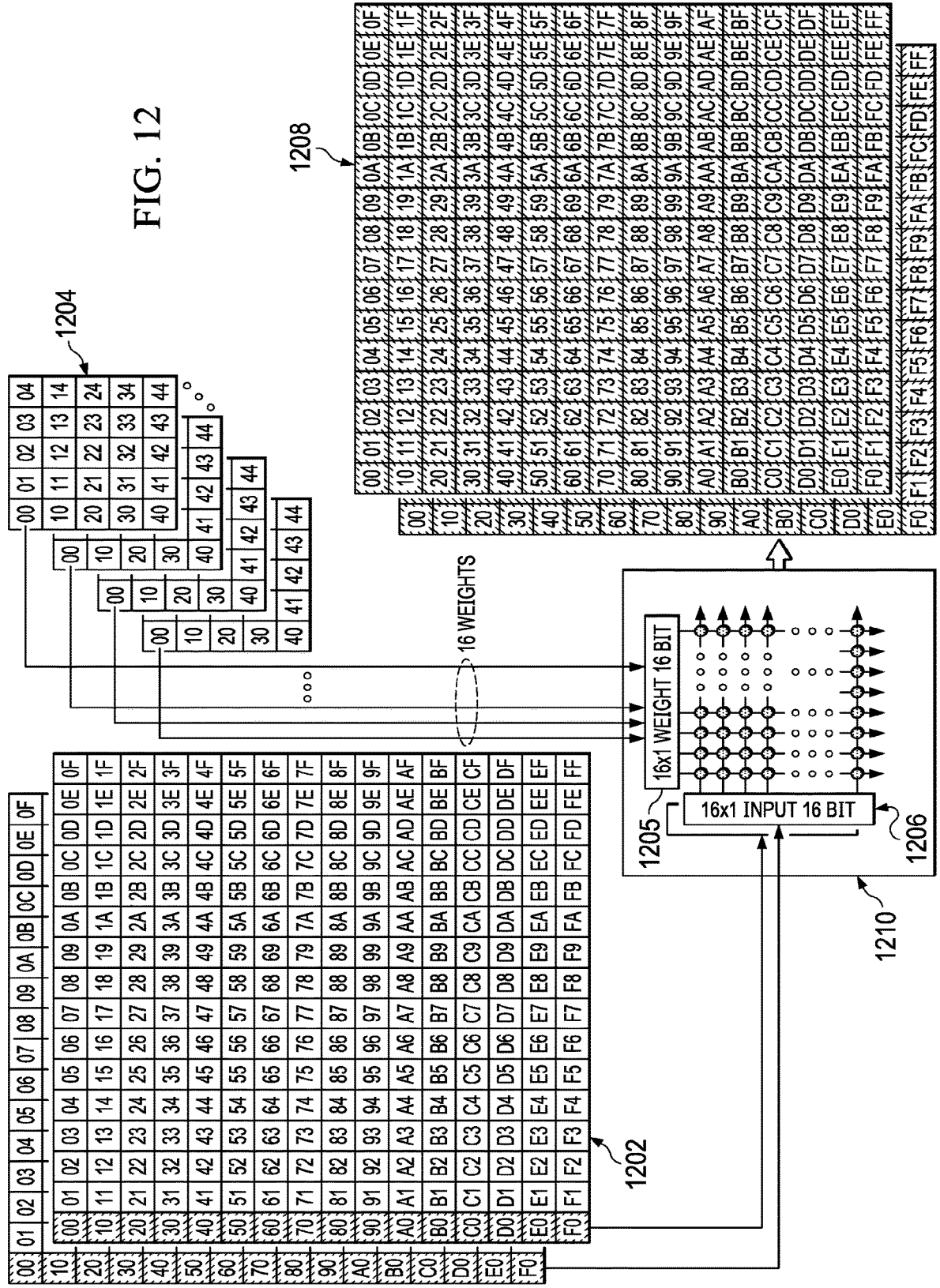
FIGS. 12-14 show an alternative example using two input matrixes and multiple weight matrixes.
Figure 13:
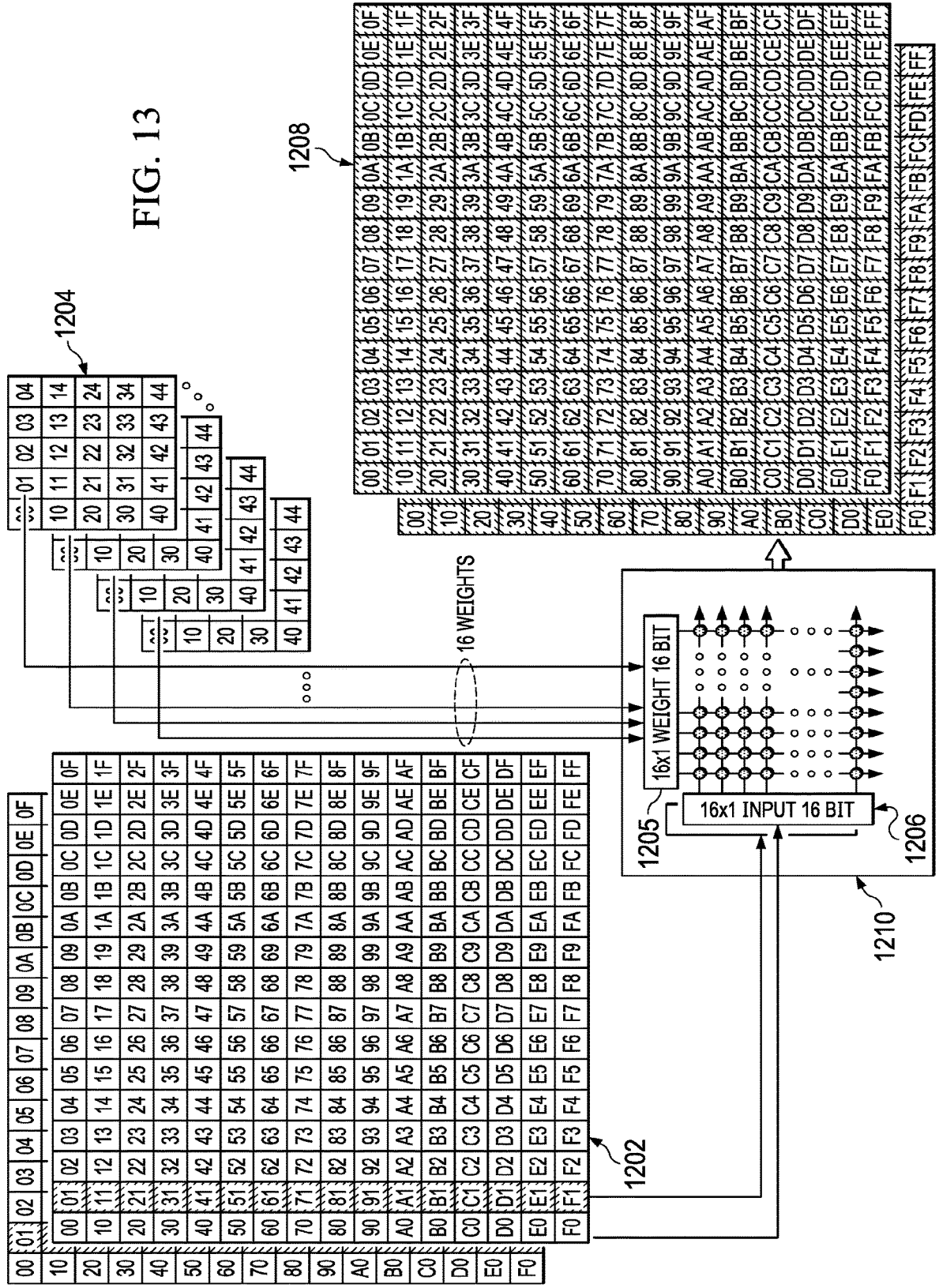
Figure 14:
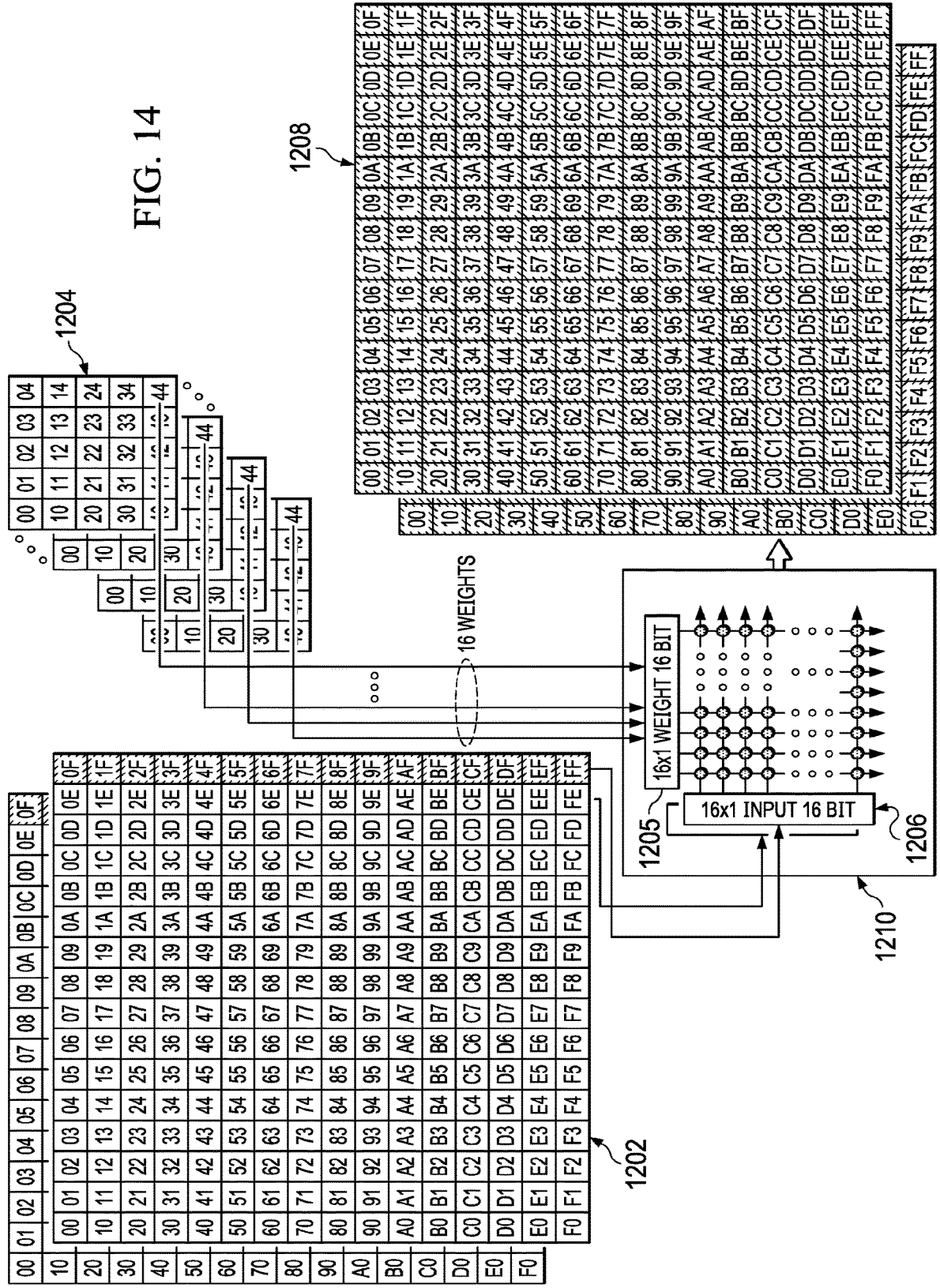

FIGS. 12-14 are block diagrams that show an efficient example using two input matrixes. Two sets of feature planes 1202 and sixteen weight matrixes 1204 are input as to two sixteen-byte input vectors 1206 and one sixteen-byte weight vector 1205, respectively. As with the example of FIGS. 8-10, weight vector 1205 includes one weight from a corresponding position in the weight matrix. The weight matrixes 1204 and lines leading from weight matrixes 1204 to weight vector 1205 represent sixteen weight matrixes and sixteen weight values. Two sets of N values (in this example, N=16) are routed into input vectors 1206 of VMU 1210. Matrix 1208 represents the data stored in the accumulators of VMU 1210. The example of FIG. 12 uses one input vector in one cycle. Weight input vector 1205 is applied for two cycles. That is, the result from multiplying one input vector by the weight input vector 1205 is stored in either first accumulator 604 or second accumulator 606 (FIG. 6). The result for multiplying the other input vector with weight vector 1205 is stored in the other of first accumulator 604 or second accumulator 606 (FIG. 6). This provides additional efficiency by avoiding the need to re-fetch weight vector 1205. The process is repeated for each weight position of the weight matrixes. The example of FIGS. 12-14 includes 25 weight positions in each weight matrix 1204. Thus, the total number of cycles I (iterations) is the size of the weight matrixes L (in this example 25 weight values) times the number of input matrixes K (in this example K=two). Thus, a full output is provided after K×L=I cycles, which is 50 cycles in the example of FIGS. 12-14 to produce two sixteen by sixteen output feature values. FIG. 13 illustrates the processing of convolutions using the structure of FIG. 12 after two cycles and FIG. 14 illustrates the final output for this portion of the convolution. The number of input matrixes and weight matrixes that are fetched at a time can be varied depending on the size of VMU 1210 and the sizes of the matrixes with the goal of full VMU utilization to maximize throughput.

More generally, in the example processing shown in FIGS. 12-14, the processing cycles may be divided into multiple groups of K processing cycles where each of the K processing cycles in a group of processing cycles processes pixels values included in a different one of the K feature planes with respect to the same set of weight values and with respect to the same set of pixel positions in the K feature planes. Each of the weight matrices 1204 may correspond to a respective CNN filter and may be alternatively referred to as a group of weight values. A first weight value from each of the weight matrices 1204 may be selected to form a first set of weight values for a first group of processing cycles. Each weight value in a set of weight values may correspond to a different CNN filter, and a set of weight values may correspond to weight values from a common weight value position in different CNN filters.

For the first group of processing cycles, a first subset of pixel positions from the ROIs of the feature planes 1202 may be selected for processing (e.g., pixel positions in the highlighted column shown in FIG. 12). During a first cycle in the first group of processing cycles, each of the weight values in the first set of weight values (for example, weight 00) may be multiplied by each of the pixel values included in the first subset of pixel positions for a first feature plane 1202 (or first input image). During a second cycle in the first group of cycles, each of the weight values in the first set of weight values may be multiplied by each of the pixel values included in the first subset of pixel positions for the second feature plane 1202 (or second input image). Each of the cycles in the first group of cycles may correspond to a respective input image. The same weight values may be used in each of the cycles in the first group of cycles, but different input images may be used for each cycle. Within each MAC node 600, a different accumulator (for example, first accumulator 604 or second accumulator 606 (FIG. 6)) may be used for each of the different processing cycles within a group of processing cycles. The same accumulator may be used for processing cycles in different groups of processing cycles that correspond to the same input image. During an individual cycle, each pixel value of the first subset of pixel positions for a respective input image may be assigned to a respective row of the VMU 1210, and each weight value of the first set of weight values may be assigned to a respective column of the VMU 1210. As such, during each of the cycles in the first group of cycles, the VMU 1210 may multiply each of the weight values in the first set of weight values by each of the pixel values in the first subset of pixel positions for a respective input image. A second group of cycles is performed after the first group of cycles. The second group of cycles is performed in a similar manner to the first group of cycles except that: (a) a second set of weight values is formed by selecting a second weight value from each of the weight matrices 1204 (for example, weight 01); (b) a second subset of pixel positions in the ROIs is selected that corresponds to the second set of weight values (for example, the highlighted column in feature planes 1202 in FIG. 13); and (c) the VMU 1210 performs the multiplications with respect to the second set of weight values and the second subset of pixel positions. The VMU 1210 continues to perform groups of cycles by shifting the subset of pixel positions selected for processing and selecting a corresponding set of weights from the weight matrices 1204 until all weights have been multiplied and corresponding partial products have been accumulated.

Figure 15:
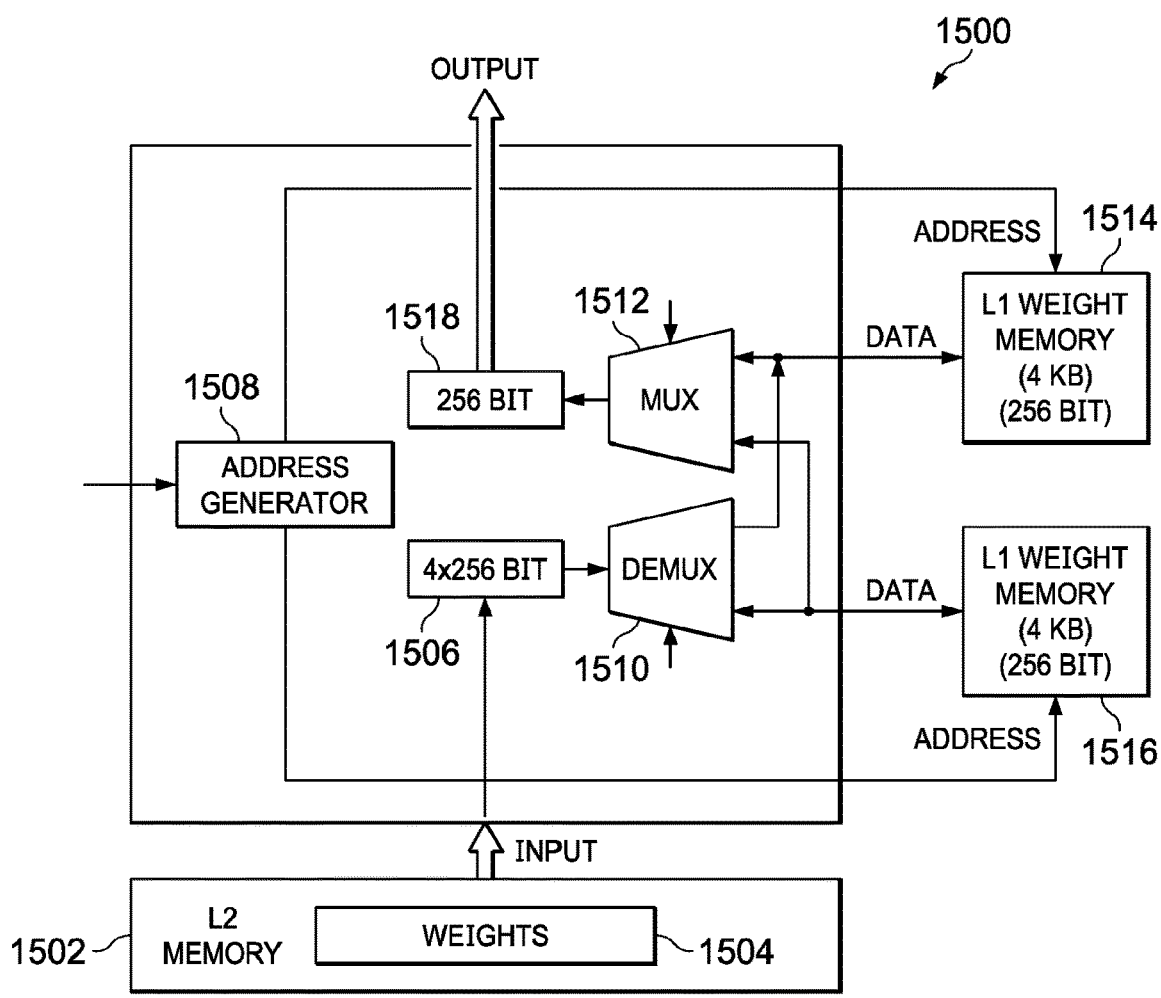
FIG. 15 is a detailed diagram of a weight feeder unit (WFU) for use with an example.

FIG. 15 is a detailed diagram of weight feeder unit (WFU) 1500, which is similar to WFU 310 (FIG. 3). Weights 1504 are fetched from L2 memory 1502 and stored in 4×256 bit register 1506. Demultiplexer 1510 routes the weights to weight memory 1514 or 1516. Address generator 1508 and multiplexer 1512 determine which weights are directed to output buffer 1518 and on to the VMU. For example, when processing fully connected layers, linear vectors (that is, rows or columns) of weight data from the weight matrix are provided to the VMU in successive clock cycles until the weight matrix has been provided. In another example, WFU 1500 may provide the same weight data for multiple cycles to be applied to linear vectors of different image planes or to different ROIs. WFU 1500 may include a controller (not shown) that is configured to control the multiplexer 1512 and the demultiplexer 1510. In some examples, in a first state, the controller may cause multiplexer 1512 to enter a state that routes weight values from weight memory 1514 to the output of WFU 1500 (e.g., to the weight vector 1205 input of VMU 1210), and may cause demultiplexer 1510 to enter a state that routes incoming weight values from memory 1502 to weight memory 1516. During a second state, the controller may cause multiplexer 1512 to enter a state that routes weight values from weight memory 1516 to the output of WFU 1500, and may cause demultiplexer 1510 to enter a state that routes incoming weight values from memory 1502 to weight memory 1514. In this way, the loading of a next set of weight values may occur while the previous set of weight values is being used. In some examples, the weight values may be stored in an interleaved fashion, e.g., as shown in FIG. 11. Each set of weight values may correspond to weight values that are taken from a common weight value position in different CNN filters. In other examples, the weight values may be stored in an interleaved fashion in the sense that consecutive memory storage slots may store weight values for different CNN filters, and within the memory storage slots, the weight values for other CNN filters may be interleaved between each of the weight values corresponding to a single CNN filter.

Figure 16:
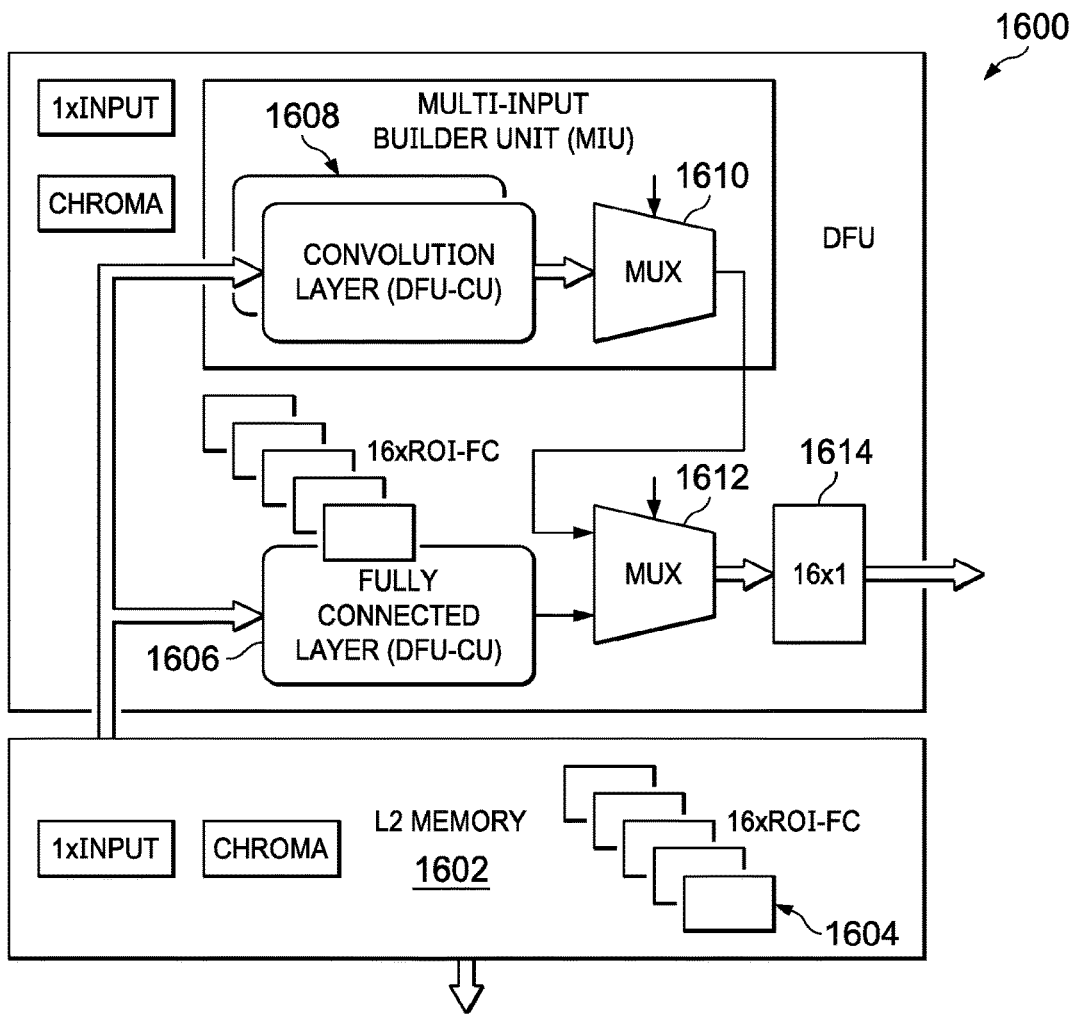
FIG. 16 is a detailed diagram of a data feeder unit (DFU) for use with an example.

FIG. 16 is a detailed diagram of data feeder unit (DFU) 1600, which is similar to DFU 312 (FIG. 3). L2 memory 1602 provides region of interest (ROI) data 1604 to a first path including convolution layer DFU 1608 and to a second path including fully connected layer DFU 1606. The data provided to the fully connected layer is the full matrix data (linear vectors of the image plane) of the ROI. Because the size of fully connected images and the corresponding filters is the same at fully connected nodes, processing of fully connected layers is a relatively straight forward matrix multiplication process. Linear vectors (that is, rows or columns) of the image plane of the ROI are provided in successive clock cycles by fully connected layer DFU 1606 until the image plane has been provided. On the other hand, convolution layer DFU 1608 rearranges the ROI data for efficient convolution processing of convolution nodes by the VMU. In addition, the convolution layer DFU 1608 may be configured to provide other arrangements of data for other mathematical operations. Multiplexors 1610 and 1612 determine which data is provided to output buffer 1614 and thus to the VMU. With this DFU configuration, MME 300 (FIG. 3) can provide convolutional output, fully connected output, or other mathematical operations.

Figure 17:
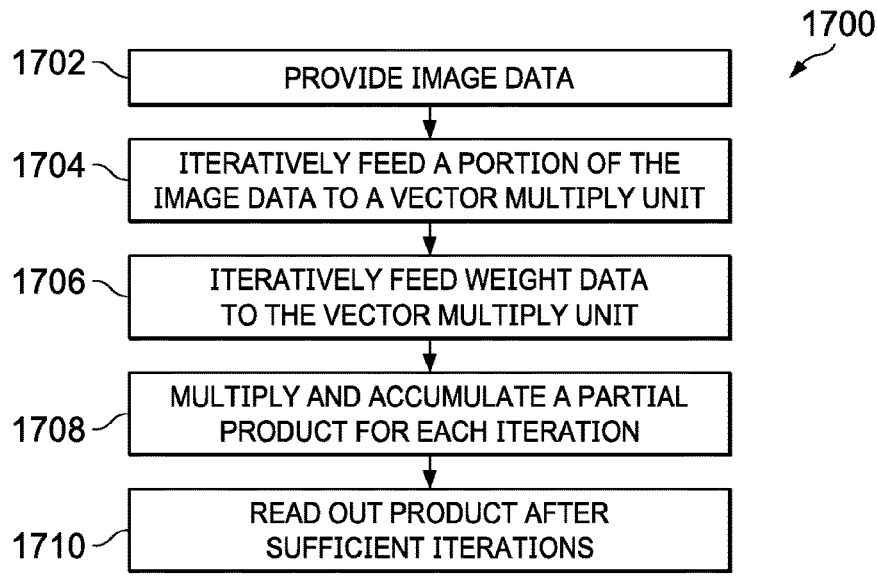
FIG. 17 is a flow diagram for a method example.

FIG. 17 is a flow diagram of an example method. Method 1700 begins with step 1702, which provides the image data (or feature plane values). Step 1704 iteratively feeds a portion of the image data to a vector multiply unit. Step 1706 iteratively feeds weight data to the vector multiply unit. Step 1708 multiplies and accumulates the image and weight data to provide a partial product. Step 1710 reads out a product after the iterations are performed.

Figure 18:
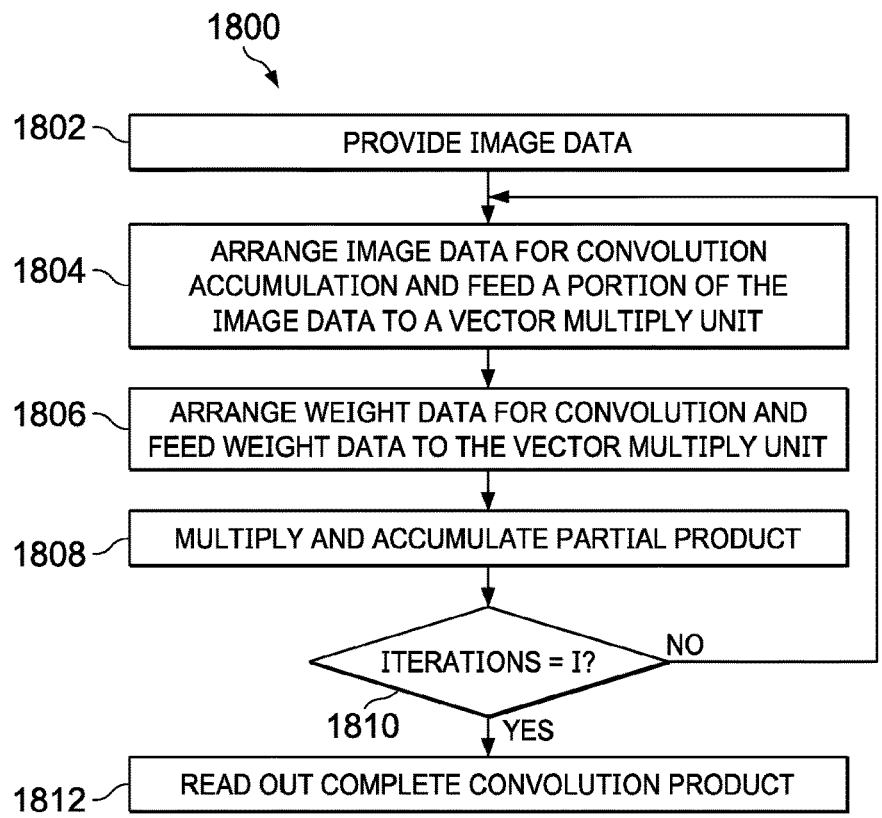
FIG. 18 is a flow diagram of another example method.

FIG. 18 is a flow diagram of another example method. Method 1800 begins with step 1802, which provides the image plane data (or feature plane values). Step 1804 arranges the image plane data using a data feeder unit like DFU 1600 (FIG. 16) to provide convolution data like convolution layers from convolution layer DFU 1608 (FIG. 16). Step 1804 feeds the arranged image plane data to a vector multiply unit like VMU 314 (FIG. 3). Step 1806 arranges the weight data using a weight feeder unit like WFU 1500 (FIG. 15) to provide convolution weight data to a vector multiply unit like VMU 314 (FIG. 3). Step 1808 multiplies the convolution data and the weight data and accumulates the partial product. Step 1810 determines if the total number of cycles I for a complete convolution product have been completed. If not, the method loops back to step 1804. If so, step 1812 reads out the complete product.

Figure 19:
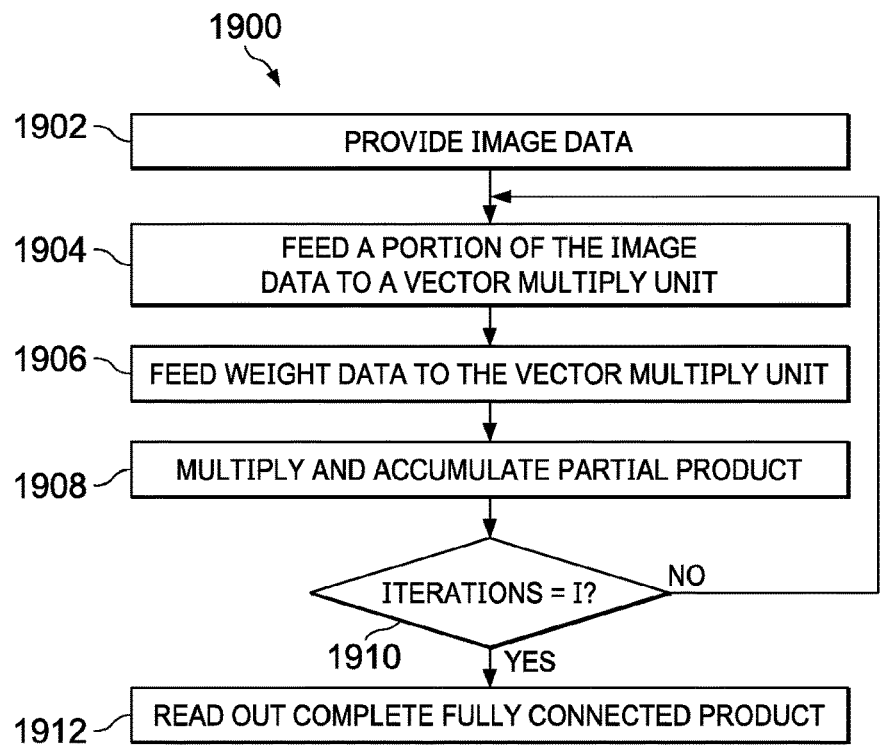
FIG. 19 is a flow diagram of another example method.

FIG. 19 is a flow diagram of another example method. Method 1900 begins with step 1902, which provides the image plane data (or feature plane values). Step 1904 provides a portion of the image plane data using a data feeder unit like DFU 1600 (FIG. 16) to provide fully connected data like fully connected layers from fully connected layer DFU 1606 (FIG. 16). Step 1904 feeds the fully connected data to a vector multiply unit like VMU 314 (FIG. 3). Step 1906 feeds the weight data using a weight feeder unit like WFU 1500 (FIG. 15) to provide fully connected weight data to a vector multiply unit like VMU 314 (FIG. 3). Step 1908 multiplies the fully connected image data and the fully connected weight data and accumulates the partial product. Step 1910 determines if the total number of cycles I for a complete fully connected product have been completed. If not, the method loops back to step 1904. If so, step 1912 reads out the complete product.

In an example, an integrated circuit includes a vector multiply unit including a plurality of multiply/accumulate nodes, in which the vector multiply unit is operable to provide an output from the multiply/accumulate nodes. The integrated circuit also includes a first data feeder operable to provide first data to the vector multiply unit in vector format and a second data feeder operable to provide second data to the vector multiply unit in vector format.

In another example, the first data feeder is operable to provide N data inputs to the vector multiply unit, in which the second data feeder is operable to provide M data inputs, and in which the vector multiply unit includes N×M multiply/accumulate nodes.

In another example, N is equal to M.

In another example, the first data is a linear vector of a region of interest with an area of N1*N2 size, where N=N1*N2.

In another example, the first data and second data are matrixes that are larger than N×M and the vector multiply unit processes the first data and the second data as sub-matrixes.

In another example, the first data feeder provides image data and the second data feeder provides weight data.

In another example, in which at least one of the multiply/accumulate nodes includes a plurality of accumulators.

In another example, the multiply/accumulate nodes provide an outer product of the first data and the second data, and multiply and accumulate the outer product in a clock cycle.

In another example, the first data feeder routes the first data and second data feeder to routes the second data for iterative accumulation of a two-dimensional convolution layer.

In another example, the first data is K feature planes and N values are read from the K feature planes in a clock cycle of the first data feeder.

In another example, the second data is multiple sets of weight data with L weight coefficients and output from the multiply/accumulate nodes is provided after K×L multiply/accumulate cycles.

In another example, the second data is multiple sets of weight data and one weight coefficient from the multiple sets of weight data is used to form a weight input vector.

In another example, the multiple sets of weight data are two-dimensional matrixes.

In another example, a set of the multiple sets of weight data is read during a clock cycle of the second data feeder.

In another example, the output of the vector multiply unit is a convolution layer and is provided after a predetermined number of multiply/accumulate cycles.

In another example, the first data feeder routes the first data and the second data feeder routes the second data for iterative accumulation of a fully connected layer.

In another example, linear vectors of an input feature plane are provided successively to the first data feeder.

In another example, linear vectors of weight data are fed successively to the second data feeder during successive clock cycles.

In another example, the output is added in an accumulator for a fixed number of cycles.

In another example, the first data includes multiple sets of ROIs (regions of interest) stacked as additional rows.

In another example, the second data is applied to multiple sets of first data.

In another example, an image processing apparatus includes a port operable to receive image data. The image processing apparatus also includes a vector multiply unit having a plurality of multiply/accumulate nodes, in which the vector multiply unit is operable to provide an output from the multiply/accumulate nodes. The image processing apparatus also includes a first data feeder operable to provide the image data to the vector multiply unit in vector format and a second data feeder operable to provide weight data to the vector multiply unit in vector format.

In another example, the first data feeder is operable to provide N data inputs to the vector multiply unit, in which the second data feeder is operable to provide M data inputs, and in which the vector multiply unit includes N×M multiply/accumulate nodes.

In another example, N is equal to M.

In another example, the image data is a linear vector of a region of interest with an area of size N1*N2, where N=N1*N2.

In another example, the image data and the weight data are matrixes that are larger than N×M and the vector multiply unit processes the image data and the weight data as sub-matrixes.

In another example, the output includes data indicating a probability of an object in the image data.

In another example, at least one of the multiply/accumulate nodes includes a plurality of accumulators.

In another example, the multiply/accumulate nodes provide an outer product of the image data and the weight data, and multiply and accumulate the outer product in a clock cycle.

In another example, the first data feeder routes the image data and second data feeder to routes the weight data for iterative accumulation of a two-dimensional convolution layer.

In another example, the image data is K feature planes and N values are read from the K feature planes in a clock cycle of the first data feeder.

In another example, the weight data is multiple sets of weight data with L weight coefficients and output from the multiply/accumulate nodes is provided after K×L multiply/accumulate cycles.

In another example, the weight data is multiple sets of weight data and one weight coefficient from the multiple sets of weight data is used to form a weight input vector.

In another example, the multiple sets of weight data are two-dimensional matrixes.

In another example, a set of the multiple sets of weight data is read for a clock cycle of the second data feeder.

In another example, the output of the vector multiply unit is a convolution layer and is provided after a fixed number of multiply/accumulate cycles.

In another example, the first data feeder routes the image data and the second data feeder routes the weight data for iterative accumulation of a fully connected layer.

In another example, the first data feeder successively provides linear vectors of an input feature plane from the image data.

In another example, the second data feeder successively provides linear vectors of the weight data.

In another example, the output is an accumulation in at least one of the plurality of multiply/accumulate nodes for a fixed number of cycles.

In another example, the image data includes multiple sets of ROIs (regions of interest) stacked as additional rows.

In another example, the weight data is applied to multiple sets of image data.

In another example, a method for image processing includes receiving first data; providing a portion of the first data to a vector multiply unit; providing second data to the vector multiply unit; and multiplying and accumulating a partial product in at least one node of the vector multiply unit, such that a product is accumulated in the at least one node of the vector multiply unit after a plurality of iterations.

In another example, the at least one node of the vector multiply unit includes a plurality of accumulators.

In another example, the multiplying and accumulating provides an outer product of the first data and the second data in a clock cycle.

In another example, the first data and second data are routed for iterative accumulation of a two-dimensional convolution layer.

In another example, the first data is K feature planes and N values are read from the K feature planes in a clock cycle of the vector multiply unit.

In another example, the second data is multiple sets of weight data with L weight coefficients and output from the vector multiply unit is provided after K×L cycles of the vector multiply unit.

In another example, the second data is multiple sets of weight data and one weight coefficient from the multiple sets of weight data is used to form a weight input vector.

In another example, the multiple sets of weight data are two-dimensional matrixes.

In another example, a set of the multiple sets of weight data are read for a clock cycle of the vector multiply unit.

In another example, an output of the vector multiply unit is a convolution layer and is provided after a fixed number of cycles of the vector multiply unit.

In another example, the first data and the second data are routed for iterative accumulation of a fully connected layer.

In another example, the first data are linear vectors of an input feature plane.

In another example, the second data are linear vectors of weight data that are provided successively to the vector multiply unit in successive clock cycles.

In another example, the first data includes multiple sets of ROIs (regions of interest) stacked as additional rows.

In another example, the second data is applied to multiple sets of first data.

In another example, the product is a convolution value.

In another example, the first data is provided on a first path that provides the first data as a first vector that corresponds to an image plane and a second path that provides the first data as a second vector that does not correspond to the image plane.

In another example, the vector multiply unit provides convolutional output and fully connected output.

Modifications are possible in the described examples hereinabove, and other arrangements that form additional examples are possible, within the scope of the claims.

What is claimed is:

1. A method comprising:
   receiving first data from a memory;
   providing, by a first data feeder, a portion of the first data to a vector multiply unit in vector format by providing a number of feature planes K to the vector multiply unit, the feature planes including at least a first feature plane and a second feature plane;
   providing, by a second data feeder, second data including a first set of weight values to the vector multiply unit by at least providing a corresponding weight from each convolution filter of a set of convolution filters to the vector multiply unit in vector format, the first set of weight values including multiple sets of weight da each set of weight data including L weight coefficients;
   multiplying and accumulating the first data and the second data as a partial product in at least one node of the vector multiply unit, such that a product is accumulated in the at least one node of the vector multiply unit after a plurality of iterations by at least:
      multiplying the first set of weight values by each pixel value in a first subset of pixel positions for the first feature plane to generate a first result;
      storing the first result in a first accumulator of the node;
      multiplying the first set of weight values by each pixel value in the first subset of pixel positions for the second feature plane to generate a second result; and
      storing the second result in a second accumulator of the node; and
   rearranging, using the first data feeder and the second data feeder, the portion of the first data and the second data so that partial products computed by the vector multiply unit for one output feature value are directed to one multiplier and one accumulator within one node of the vector multiply unit;
   reading the first and second results from the node after a delay of at least K×L cycles after a previous iteration of the reading step; and
   storing the first and second results in the memory.

2. The method of claim 1 in which the multiplying and accumulating provides an outer product of the first data and the second data in a clock cycle.

3. The method of claim 1 in which the first data is K feature planes and N values are read from the K feature planes in a clock cycle of the vector multiply unit.

4. The method of claim 3 in which the second data is multiple sets of weight data with L weight coefficients and output from the vector multiply unit is provided after K×L cycles of the vector multiply unit.

5. The method of claim 1 in which an output of the vector multiply unit is a convolution layer and is provided after a fixed number of cycles of the vector multiply unit.

6. The method of claim 1 in which the first data is one row of length N, in which the second data is one column of length M that are read in a first cycle and multiplied and accumulated in N×M nodes in the vector multiply unit in a second cycle and in which, after the plurality of iterations, the N×M nodes are a results matrix that is at least part of a complete results matrix.

7. The method of claim 1, wherein, after the first and second results are read from the node, the first and second results are processed by one or more convolution layers or output layers prior to being stored in the memory.

8. A device comprising:
   a memory;
   a vector multiply unit coupled to the memory;
   a first data feeder configured to provide first data to the vector multiply unit in vector format by providing a number of feature planes K to the vector multiply unit, wherein the feature planes include at least a first feature plane and a second feature plane;
   a second data feeder configured to provide second data including a first set of weight values to the vector multiply unit by at least providing a corresponding weight from each convolution filter of a set of convolution filters to the vector multiply unit in vector format,
   wherein the first set of weight values includes multiple sets of weight data, each set of weight data including L weight coefficients,
   wherein the first data feeder and the second data feeder are configured to rearrange the first data and the second data so that partial products computed by the vector multiply unit for one output feature value are directed to one multiplier and one accumulator within one node of the vector multiply unit, wherein the vector multiply unit is configured to multiply and accumulate the first data and the second data as a partial product in at least one node of the vector multiply unit, such that a product is accumulated in the at least one node of the vector multiply unit after a plurality of iterations by at least:

multiplying the first set of weight values by each pixel value in a first subset of pixel positions for the first feature plane to generate a first result;

storing the first result in a first accumulator of the node;

multiplying the first set of weight values by each pixel value in the first subset of pixel positions for the second feature plane to generate a second result; and storing the second result in a second accumulator of the node; and wherein the device is configured to:

read the first and second results from the node after a delay of at least K×L cycles after a previous iteration of the read action; and store the first and second results in the memory.

9. The device of claim 8, wherein the vector multiply unit is configured to perform the multiplying and accumulating to provide an outer product of the first data and the second data in a clock cycle.

10. The device of claim 8, wherein the first data is K feature planes, and wherein the device is configured to read N values from the K feature planes in a clock cycle of the vector multiply unit.

11. The device of claim 10, wherein the second data is multiple sets of weight data with L weight coefficients, and wherein the vector multiply unit is configured to provide an output after K×L cycles of the vector multiply unit.

12. The device of claim 8, wherein the vector multiply unit is configured to provide an output after a fixed number of cycles of the vector multiply unit.

13. The device of claim 8, wherein the first data is one row of length N, wherein the second data is one column of length M that is read in a first cycle and multiplied and accumulated in N×M nodes in the vector multiply unit in a second cycle, and wherein, after the plurality of iterations, the N×M nodes are a results matrix that is at least part of a complete results matrix.

14. The device of claim 8, wherein, after the first and second results are read from the node, one or more convolution layers or output layers are configured to process the first and second results prior to being stored in the memory.

* * * * *